Jan. 11, 1938.  E. O. SCHJOLIN  2,104,818
VEHICLE SEAT
Filed Dec. 31, 1935

Inventor
Eric Olle Schjolin
By Blackmore, Spencer & Shirt
Attorneys

Patented Jan. 11, 1938

2,104,818

UNITED STATES PATENT OFFICE 2,104,818

VEHICLE SEAT

Eric Olle Schjolin, Pontiac, Mich., assignor to General Motors Corporation, Detroit, Mich., a corporation of Delaware Application December 31, 1935, Serial No. 56,934

8 Claims. (Cl. 155—179)

This invention relates to seats for automobiles.

It is the object of the invention to construct a seat which is easy and economical to manufacture; which may be readily removed from the vehicle; which is easy to adjust; leaves an open space between the bottom of the seat and the floor; and avoids the use of the usual spring cushions.

The objects of the invention are accomplished by constructing a supporting frame composed of tubing having lateral legs of U-shape and a back support of inverted U-shape. On the frame there is supported a pan having a seat portion and a back portion, the pan being provided with flanges at its edges. In the pan there is glued or adhesively secured a rubber cushion or pillow provided with a plurality of air pockets and over the cushion there is adhesively secured a fabric covering.

Figure 1:
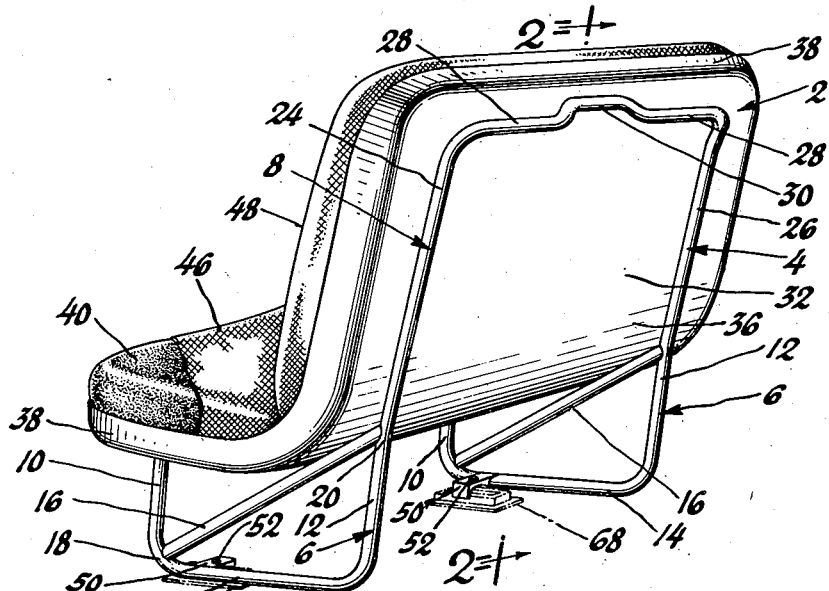
Figure 1 is a perspective view of the seat with parts broken away better to indicate the structure.

Referring to the drawing, the numeral 2 indicates the seat as a whole. A support for the seat is indicated as a whole at 4 and comprises a tubular framework having the U-shaped legs 6 at the sides and the inverted U-shaped back portion 8. Each U-shaped leg comprises the forward upright 10, the rear upright 12, and the base 14, the base 14 resting on the floor to support the frame and seat. Each leg 6 also has the diagonal brace 16 extending from the lower forward corner 18 of the U to the top 20 of the rear upright 12. The members 16 are suitably welded in place.

Figure 2:
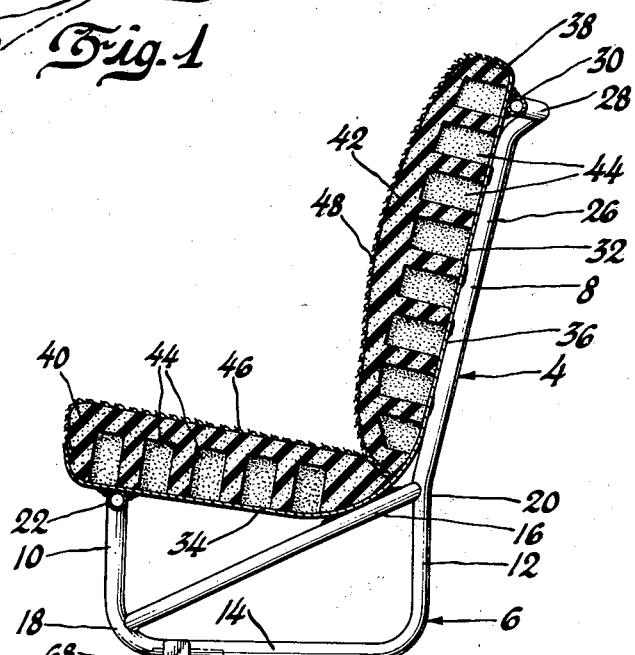
Figure 2 is a section on the line 2—2 of Figure 1.
Figure 3:
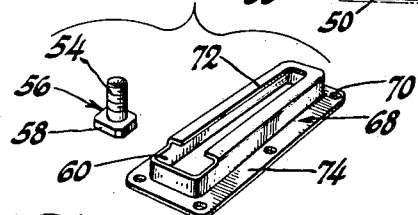
Figure 3 is a perspective view of the bracket secured to the floor of the vehicle to permit the adjustment of the seat.

Referring to Figure 2, the forward uprights 10 of the two legs 6 are connected by means of the transverse supporting tube 22.

The inverted U-shaped member 8 at the back comprises the lateral uprights 24 and 26 and the bight member 28. The upper end of the uprights 24 and 26 is bent outwardly or away from the plane of the uprights as indicated at 30 in Figure 2. At the mid portion of the bight 28 there is an inwardly bent portion 30, the inner edge of which is in the same plane as the inner edge of the uprights 26 as is best shown in Figure 2. The uprights 24 and 26 are continuations of the uprights 12 of the legs 6.

A pan 32 is supported on the tubular framework 4. The pan comprises the seat portion 34 and the back portion 36. The front of the seat portion 34 rests on the transverse tube 22 and on the upper end of the inclined member 16 of the legs. The pan portion 34 is welded to the cross member 22, preferably at three points, and to the transverse members 16 at a single point.

The back portion 36 of the pan 32 is suitably welded at a plurality of points to the uprights 24 and 26 and to the indented portion 30 of the bight 28. As will be best seen from Figure 2, the bight 28 of the inverted U-shaped member 8 is spaced from the back portion 36 of the pan so as to form a robe rail.

The pan 32 has the peripheral flange 38 entirely therearound so that the seat portion 34 and rear portion 36 are dish-shaped.

The usual coil springs and necessary supports therefor used in connection with the conventional seat cushions are not used with the present construction. In place thereof the resilient portion of the seat proper and the back is formed by rubber cushions or pillows. One of the cushions 40 forms the seat proper and the second cushion 42 the back. Both cushions are provided throughout their extent with rectangular air pockets or columns 44, and both cushions 40 and 42 have adhesively secured thereto the outer fabric covering 46 and 48. This covering 46 and 48 is applied to the pillows or cushions before they are put in place on the pan 32. After the covering 46 and 48 has been applied, the cushions are stuck or adhesively secured by the use of a suitable paste or glue to the back portions 34 and 36 with the marginal edges of the fabric covering 46 and 48 passing under the flange 38 to conceal the same. After the cushions have been adhesively secured to the back 32 no further labor is necessary and the seat is in its final shape. The air pockets formed by the columns 44 and the resiliency of the rubber itself furnishes a seat and back which are resilient enough to meet all ordinary requirements.

At the base member 14 of each leg 6 there is secured the finger 50 provided with a hole 52. The hole 52 is for the purpose of receiving the shank 54 of a bolt 56, the head 58 of which is received in the opening 60 in one end of a bracket 68 which is fastened to the floor of the vehicle by screws passing through the openings 70. The shank of the bolt 56 may pass into the slot 72 of the bracket 68 to permit the adjustment of the seat. Suitable wing nuts (not shown) fastened to the threaded portion of the shank 54 hold the seat in adjustable position. To adjust the seat the wing nuts are loosened and the seats shifted either forwardly or rearwardly and the wing nuts then retightened.

If desired, the bracket 68 may be attached to the top of the floor, or optionally, it may be sunk into the floor and the bracket fastened to the underside of the floor by means of the flange 74.

I claim:

1. In a seat, a continuous length of tubing forming two legs and a support for the seat back, each leg being U-shaped and having the base of the U at the bottom and the support for the back being U-shaped and having the base of the U at the top of the seat, said length of tubing also comprising a forward member extending from one upright of the U-legs to the upright of the other U-leg and forming a transverse support, a pan forming a seat bottom and back mounted on and secured to the tubing and having its front end resting on the transverse support, the upper portion of said tubing being spaced from the back of said pan to form a robe rail, and a cushioning material adhesively secured to the pan to form a resilient seat and back.

2. In a seat, a continuous length of tubing forming two spaced legs at the ends of the seat and a support for a seat back, each leg being U-shaped and having front and rear uprights with the base of the U at the bottom, the support for the back being U-shaped and having the base of the U at the top of the seat and downwardly projecting uprights joining with the rear uprights of the legs, said length of tubing also comprising a forward member extending from the front upright of one of the U legs to the front upright of the other U leg and forming a transverse support, diagonal braces to reinforce the legs, a pan forming a seat bottom and back mounted on and secured to the tubing and having its front end resting on the transverse support and the seat bottom secured to the diagonal braces, the uppermost portion of said tubing being spaced from the back of said pan to form a robe rail, and a cushioning material secured to the pan to form a resilient seat and back.

3. In a seat, a continuous tubular supporting frame comprising a forward transverse supporting portion, U-shaped side supporting portions having forward and rearward uprights and diagonal braces therefor, and an inverted U-shaped back supporting portion extending in continuation of said rearward uprights and having a forwardly bent part near the mid-point of the bight thereof; a pan forming a seat bottom and back mounted on and secured to said tubular supporting frame, said forwardly bent part of the tubular back supporting portion being secured to the back of said pan, whereby the bight of said inverted U-shaped back supporting portion is spaced from the seat back to form robe rails; and a seat bottom and a back formed of cushion rubber mounted on said pan.

4. In a seat, a continuous length of tubing forming a plurality of legs and a support for the seat back, an integral, rigid, non-flexible metal pan forming a seat bottom and back welded to the tubing, said pan being bent intermediate its ends to form the seat bottom and back, an edge flange extending inwardly around the entire pan, and a rubber cushioning material secured directly to the pan.

5. In a seat, a continuous length of tubing forming a plurality of spaced legs and an upright support for the seat back, said legs being positioned at the ends of the seat and extending below and forwardly of the back support, an integral rigid non-flexible metal pan bent intermediate its ends to form a seat bottom and a seat back, said back being welded to the support and said bottom being supported by said legs, flanged edges on the pan projecting inwardly toward the seat portion of the seat, and a rubber cushioning material secured directly to the pan and to the flanges.

6. In a seat, a continuous length of tubing forming a plurality of spaced legs and an upright support for the seat back, said legs being positioned at the ends of the seat and extending below and forwardly of the back support, an integral rigid non-flexible metal pan bent intermediate its ends to form a seat bottom and a seat back, said back being welded to the support and said bottom being supported by said legs, flanged edges on the pan projecting inwardly toward the seat portion of the seat, a rubber cushioning material secured directly to the pan and to the flanges, and an outer covering fabric secured directly over the rubber cushioning material.

7. In a seat, a continuous length of tubing forming a plurality of spaced legs and an upright support for the seat back, said legs being positioned at the ends of the seat and extending below and forwardly of the back support, an integral rigid non-flexible metal pan bent intermediate its ends to form a seat bottom and a seat back, said back being welded to the support and said bottom being supported by said legs, flanged edges on the back projecting inwardly toward the seat portion of the seat, a rubber cushioning material secured directly to the pan and to the flanges, and an outer covering fabric secured directly over the rubber cushioning material, the edges of the fabric concealed behind the edges of the flanges.

8. In a seat, a continuous length of tubing forming a plurality of spaced legs and an upright support for the seat back, said legs being positioned at the ends of the seat and extending below and forwardly of the back support, an integral rigid non-flexible metal pan bent intermediate its ends to form a seat bottom and a seat back, said back being welded to the support and said bottom being supported by said legs, and a rubber cushioning material secured directly to the pan, said cushioning material having a plurality of air spaces or pockets having an open end facing the pan.

ERIC OLLE SCHJOLIN.